United States Patent [19]

Tikhonova

[11] Patent Number: 5,895,511

[45] Date of Patent: Apr. 20, 1999

[54] METHOD OF PRODUCING A DECORATIVE CONSTRUCTION MATERIAL

[75] Inventor: Nailia A. Tikhonova, Moscow, Russian Federation

[73] Assignee: Futuristic Tile, L.L.C., Allenton, Wis.

[21] Appl. No.: 08/995,644

[22] Filed: Dec. 22, 1997

[51] Int. Cl.⁶ .................................................. C03B 19/06
[52] U.S. Cl. ........................... 65/17.6; 65/19; 65/144
[58] Field of Search ............................. 65/17.3, 17.6, 65/19, 144

[56] References Cited

U.S. PATENT DOCUMENTS

| | | | |
|---|---|---|---|
| 1,185,555 | 5/1916 | Thomas | 264/644 |
| 1,341,979 | 6/1920 | Gronroos | 65/17.3 |
| 3,546,061 | 12/1970 | Kraemer et al. | 428/312.6 |
| 3,883,337 | 5/1975 | Helgesson et al. | 65/31 |
| 3,963,503 | 6/1976 | MacKenzie | 501/39 |
| 4,054,435 | 10/1977 | Sakane et al. | 65/17.5 |
| 4,173,609 | 11/1979 | Engstrom | 264/43 |
| 4,187,266 | 2/1980 | Greskovich et al. | 264/43 |
| 4,313,900 | 2/1982 | Gonzales, Jr. et al. | 264/642 |
| 4,818,731 | 4/1989 | Mizutani et al. | 501/17 |
| 4,833,015 | 5/1989 | Furuuchi et al. | 428/309.9 |
| 5,080,959 | 1/1992 | Tanaka et al. | 428/212 |
| 5,350,004 | 9/1994 | Rocazella et al. | 164/97 |
| 5,425,909 | 6/1995 | Fu et al. | 264/44 |
| 5,445,772 | 8/1995 | Uchida et al. | 264/35 |
| 5,536,345 | 7/1996 | Lingart | 156/89.24 |
| 5,720,835 | 2/1998 | Lingart et al. | 264/113 |

FOREIGN PATENT DOCUMENTS

| | | |
|---|---|---|
| 41 25 698 C 1 | 11/1992 | Germany. |
| 43 19 808 C 1 | 7/1994 | Germany. |
| 546569 | 2/1977 | U.S.S.R. |

*Primary Examiner*—Stanley S. Silverman
*Assistant Examiner*—Sean Vincent
*Attorney, Agent, or Firm*—Foley & Lardner

[57] ABSTRACT

A method of producing a resilient decorative construction material from waste products such as slag granulate or waste glass granulate is taught. The waste glass granulate may contain paper, adhesives, plastic, or other contaminants. The construction material may be in the shape of a tile and used in interior or exterior applications. A layer of material comprising glass granulate, slag granulate, or sand, or mixtures thereof, is placed in a heat-resistant mold. The layer has first and second surfaces. The layer is thermally treated, and is initially heated so that a temperature gradient is established throughout the layer, with the first surface having a first temperature no greater than the softening point, and the second surface having a second temperature less than the first temperature. These temperatures are held for a period of time, and the layer subjected to further heating. The further heating is to a temperature sufficient to sinter the layer, and also to reverse the temperature gradient throughout the layer, so that the first surface has a lower temperature than the second surface. These temperatures are held for a period of time sufficient to sinter the layer into a construction material. The layer is then cooled and annealed to produce the final product.

39 Claims, 3 Drawing Sheets

5,895,511

METHOD OF PRODUCING A DECORATIVE CONSTRUCTION MATERIAL

FIELD OF THE INVENTION

The invention relates generally to a method of producing a decorative construction material and more specifically to a method of producing a decorative construction material from waste glass granulate, slag granulate, sand or combinations thereof.

BACKGROUND OF THE INVENTION

Waste glass, especially post consumer waste glass, has become problematic in today's society. Many methods are known for recycling the waste glass, including grinding up the glass into particles followed by melting or sintering the glass particles into new glass objects, including construction materials such as glass or tiles. However, in order to use waste glass for such purposes, it is necessary to separate the glass from the plastic, paper and other materials with which the waste glass is mixed.

Often one of the most expensive and difficult steps in the process of recycling such waste glass is cleaning the glass and removing all the plastic, paper and other contaminants from the waste glass prior to its recycling. The presence of waste paper may be especially problematic because the burning of such paper during thermal processing of the glass into construction material such as a tile may create bubbles which will rise to the surface of the construction material being produced, resulting in an uppermost surface containing defects in the form of bubbles or pores. Such flaws in the resulting construction material make it unsuitable for many applications, wherein the appearance of the construction material is paramount.

There are various kinds of equipment known in the art that are able to separate the glass material from most of the metal, plastic and papers during processing and milling of the waste glass for use. Inevitably, however, some part of these waste materials stay in the crushed glass. There remains a need to be able to produce a construction material from waste glass wherein the waste glass is contaminated with paper, plastic and other contaminants, resulting in a construction material that has a substantially defect-free outer surface, so that the construction material will be suitable for decorative uses. Moreover, a need exists for the production of a construction material from waste glass or other industrial waste material such as slag that will have sufficient mechanical strength and durability to be used in a broad spectrum of applications including exteriors and floors of buildings.

SUMMARY OF THE INVENTION

In accordance with the invention, a method for producing a construction material comprising glass granulate, together with optional ingredients including slag granulate, sand or mixtures thereof is provided.

In one embodiment, the present invention provides a method of producing a decorative construction material for interior and exterior applications comprising dispensing a layer of material in a heat-resistant mold, the layer having a first surface in contact with the mold and an exposed second surface. The layer comprises glass granulate and may include at least one material selected from the group consisting of slag granulate, sand and mixtures thereof. The mold and layer are placed in a kiln. The layer is then heated initially from the bottom of the mold, to establish a temperature gradient throughout the layer, with the first surface of the layer having a temperature no greater than the softening point of the material used, and the second surface having a second temperature lower than the first temperature. These temperatures are maintained for a period of time and then the layer is further heated. The layer is then heated to a higher temperature sufficient to sinter the material in the layer. During this portion of the heating process, the temperature gradient throughout the layer is reversed, such that the first surface has a third temperature and the second surface has a fourth temperature greater than the third temperature. The third and fourth temperatures are maintained for a period of time sufficient to sinter the material into a construction material having a substantially defect-free second surface, followed by cooling and annealing of the construction material. The construction material is then removed from the mold, and optionally can be sanded and polished.

Additionally, the invention comprises a method of manufacturing a construction material comprising two layers. Each layer comprises glass granulate and may include at least one material selected from the group consisting of slag granulate, sand and mixtures thereof. A first layer of material is placed in a heat resistant mold, the first layer having a first surface in contact with the mold, and an exposed second surface. A second layer of material, having a first surface and a second surface, is disposed directly on the first layer, such that the second layer's first surface covers the second surface of the first layer. The layers are then heated within the mold such that a temperature gradient is established throughout the layers with the first surface of the first layer having a first temperature no greater than the softening point of the material comprising the first layer, and the second surface of the second layer having a second temperature which is less than the first temperature. These temperatures are therefor maintained for a period of time and the layers are further heated. The layers are then further heated to a temperature sufficient to sinter the first and second layers. During this portion of the heating process, the temperature gradient throughout the layers is reversed, such that the first surface of the first layer has a third temperature and the second surface of the second layer has a fourth temperature greater than the third temperature. The third and fourth temperatures are maintained for a period of time sufficient to sinter the material into a construction material having a substantially defect-free second surface, followed by cooling and annealing of the construction material. The construction material is then removed from the mold, and optionally can be sanded and polished.

The present invention further comprises a method of manufacturing a construction material comprising three layers. Each layer comprises glass granulate and may include at least one material selected from the group consisting of slag granulate, sand and mixtures thereof. A first layer of material is placed in a heat resistant mold, the first layer having a first surface in contact with the mold, and an exposed second surface. A second layer of material, having a first surface and a second surface, is disposed directly on the first layer, such that the second layer's first surface covers the second surface of the first layer. A third layer of material, having a first and second surface, is disposed directly on the second layer, such that the third layer's first surface covers the second surface of the second layer. The layers are then heated within the mold such that a temperature gradient is established throughout the layers with the first surface of the first layer having a first temperature no greater than the softening point of the material comprising the first layer, and the second surface of the third layer having a second temperature which is less than the first temperature. These temperatures are therefor maintained for a period of time and the layers are further heated. The layers are then further heated to a temperature sufficient to sinter the three layers. During this portion of the heating process, the temperature gradient throughout the layers is reversed, such that the first surface of the first layer has a third temperature and the second surface of the third layer has a fourth temperature greater than the third temperature. The third and fourth temperatures are maintained for a period of time sufficient to sinter the material into a construction material having a substantially defect-free second surface, followed by cooling and annealing of the construction material. The construction material is then removed from the mold, and optionally can be sanded and polished.

In another embodiment of the present invention, a multiple layer construction material is produced wherein one or more of the layers comprises one or more materials selected from the group consisting of slag granulate, sand, and mixtures thereof, excluding the presence of glass granulate. At least one layer of the multiple layer construction material comprises glass granulate, preferably, although not necessarily, the last layer placed within the mold. Glass granulate may not be present in the remaining layers of the multiple layer construction material of this embodiment.

In another embodiment of the present invention, a method is provided wherein the cooling and annealing step comprises cooling the layer(s) to a fifth temperature which is equal to or lower than the upper annealing point, and maintaining this fifth temperature to dissipate the temperature gradient throughout the layer(s) to allow the entire layer(s) to reach about the same temperature. This is followed by further cooling the layer(s) to a sixth temperature at a rate of about 0.5–4.0° C. per minute until a temperature about 10–20° C. below the lower annealing point is reached, and finally cooling the layer(s) to an ambient temperature at a rate of about 5–50° C. per minute.

In another embodiment of the present invention, one or more layers of the above construction materials will initially include a colorant and/or a bonding agent prior to thermal treatment.

DETAILED DESCRIPTION OF THE INVENTION

Figure 1:
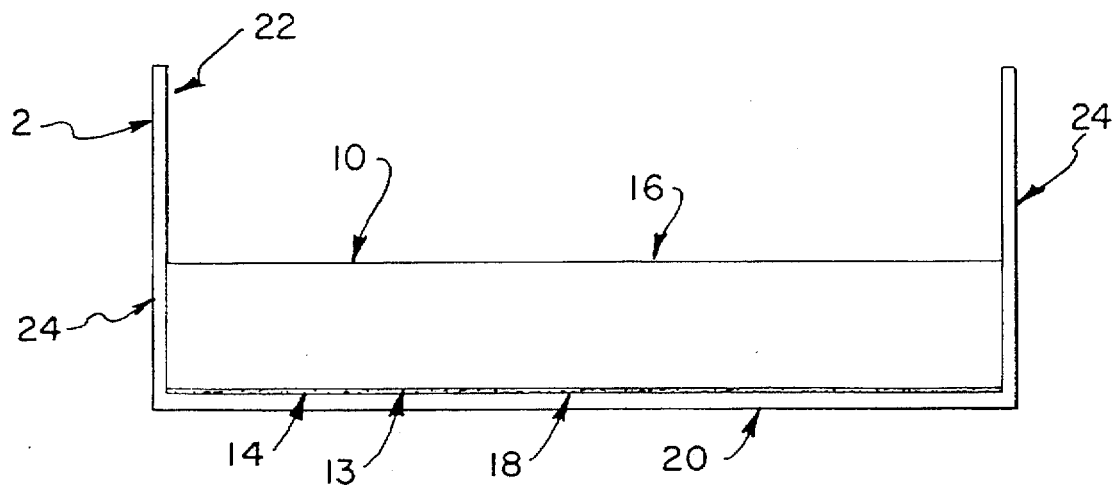
FIG. 1 is a cross section of a heat-resistant mold containing a single layer construction material in accordance with the present invention.

In the description that follows, a number of terms are utilized extensively. Definitions are herein provided to facilitate understanding of the invention.

Bonding Agent: A material which helps prevent bubbles of gas from forming in a tile during thermal treatment and rising to the surface, helping to prevent defects from appearing in the surface of the resulting tile. Typical bonding agents include, but are not limited to inorganic agents such as $Na_2SiO_3$, $K_2SiO_3$, and $Al_2O_3 \cdot 2SiO_2$ (Kaolin), and organic agents such as sodium carboxymethylcellulose.

Colorant: Any metal oxide which is typically used in ceramic or glass industry for coloration of glass or ceramic materials. The metals to produce the oxides may be of various oxidation states and typically include, but are not limited to, oxides of: Fe, Al, Si, Zn, Ca, Mg, Co, Cr, Zr, Pb, Ni, Mn, Mo, Cu, Sn, V, and Sb.

Glass Gramulate: Ground glass particles which includes glass particles manufactured from waste glass or dirty glass, i.e., glass collected from industrial and/or residential waste which contains impurities such as plastic particles, paper, metals, etc. Any pure, scrap or waste material comprising primary glass or glass particles, is within the definition of this term.

Key Points: The lower annealing point, softening point, and upper annealing point of the glass granulate in a distinct layer of the construction material.

Lower Annealing Point: The temperature at which a glass granulate has the viscosity of $10^{14.5}$ poise.

Slag Granulate: Articles of the non-metallic waste product resulting from the interaction of flux and impurities in the melting and finding of metals.

Softening Point: The temperature at which a glass granulate has the viscosity of $10^{7.65}$ poise.

Upper Annealing Point: The temperature at which a glass granulate has the viscosity of $10^{13}$ poise. In practice, this temperature will not vary much, as most waste glass consists of container (bottle) or flat (window) glass, which is a soda-lime glass whose composition does not vary much between different countries. Some special glasses with higher or lower annealing points may be present in the waste-glass material, but the quantity of such glasses is generally very small since such special glass is usually collected separately.

The subject of the invention is a construction material, comprising one or more distinct layers, each layer being made up of one or more materials selected from the group consisting of glass granulate, slag granulate, sand, and mixtures thereof. Such construction materials can be used as an internal or external tiling for buildings, industrial and residential areas, health facilities, or for floors thereof.

The preferred material for each layer of the construction material is glass particles, preferably waste glass particles which include small amounts of metal, plastic, paper, adhesives or other contaminants found in the waste glass that has not been separated during processing of the waste glass into waste glass particles via grinding or other techniques well known in the art. By using the methods of the present invention, it has been surprisingly and unexpectedly discovered that is not necessary to remove the paper, adhesive material, and other impurities from the waste glass prior to its use in the formation of a construction material, thus eliminating expensive and time consuming cleaning steps in preparing the waste glass for use in a construction material.

Glass used in the present invention needs only to be ground to uniform particle sizes, without extensive precleaning, generally having the size of less than 5 mm, preferably having average size of 2 mm or less. The glass may be colored glass or clear glass. Typically, the chemical composition of the slag granulate is: $SiO_2$=30–62%, $Al_2O_3$=6–25%, FeO=0.3–10%, CaO=1–50%, and MgO=1–10%. In a preferred embodiment, the construction material will be prepared from a combination of glass granulate and slag granulate and be free of sand. In another preferred embodiment, the construction material will be prepared from glass granulate and be free of slag granulate and sand.

Since multiple types of glass granulate may be used in any particular layer, it may be necessary to calculate the viscosity for particular combinations of glass to make the appropriate temperature determination. Furthermore, multiple layer construction materials may comprise two or more layers which contain glass granulate having different key points for each layer. In such cases, the temperatures utilized during manufacture will preferably consist of utilizing the lowest of the key points for the multiple layers. However, in such cases where multiple key points exist, a longer pause at each of the lowest of the lower annealing points and upper annealing points typically up to 50% greater in time, will be required during processing to ensure a defect-free product. Additionally, if multiple temperatures exist for such upper and lower annealing points, it is possible to heat the layers to each of the distinct upper and lower annealing points for each layer in the construction material, followed by an appropriate length dwell at the specified upper and lower annealing point temperature. It is also possible to utilize the highest of each of the softening points if multiple softening points exist for multiple layer construction materials comprising two or more layers containing glass granulate having distinct softening points. If the highest of such points is utilized, the dwell or pause time at each of these points will be less than if the lowest softening points are used. Finally, a combination may be used, utilizing the highest of some key points, the lowest of other key points, and/or multiple key points and pauses thereof.

In a preferred embodiment, the construction material will be a single layer comprising 25–100% glass granulate by weight, 0–40% slag granulate by weight; and 0–35% sand by weight. The amounts of each material will vary depending upon the choices of glass granulate, slag granulate and sand actually used. In a preferred one layer embodiment, the construction material will have a thickness from about 5–25 mm and a preferred thickness of about 12 mm.

In a two layer construction material made according to the method of the present invention, a preferred embodiment will comprise a first layer comprising glass granulate and may optionally include slag granulate, sand and mixtures thereof. The first layer will be preferably 25–100% glass granulate by weight, 0–40% slag granulate by weight and 0–35% sand. The second layer in the preferred embodiment will comprise glass granulate, to the exclusion of slag granulate and sand. In the preferred embodiment, the first layer will have a thickness of 0–33 mm, preferably 12 millimeter and the second layer will have a thickness of 1–5 mm, preferably 3 mm. Preferably the second layer will not comprise more than 10–25% of the total thickness of the construction material.

In another preferred embodiment, the construction material will comprise two layers, with the first layer comprising sand, slag granulate or mixtures thereof, and the second layer comprises glass granulate. The second layer may additionally comprise sand, slag granulate, or mixtures thereof.

In another preferred embodiment, the construction material will comprise three layers. In a preferred three layer embodiment, the first and second layers will comprise glass granulate and may additionally include at least one material selected from the group consisting of slag granulate, sand and mixtures thereof, while the third layer will comprise glass granulate and exclude the presence of slag granulate and sand. In the preferred embodiment, the first layer will have a thickness of 1–6 mm, preferably 2 mm, the second layer will have a thickness of 3–30 mm and preferably 15 mm and the third layer will have a thickness of 1–6 mm, preferably 3 mm. In the preferred embodiment, the first and third layers each will comprise not more than 10–30% of the total thickness of the construction material.

In another preferred three layer embodiment, one or both of the first two layers will comprise sand, slag granulate, or mixtures thereof, and exclude the presence of glass granulate. One of the first two layers may contain glass granulate. The third layer will comprise glass granulate, and may additionally comprise sand, slag granulate, or mixtures thereof.

The construction material may also contain optional ingredients including one or more colorants. The addition of various colorants to the construction material will allow construction materials of various colors to be produced and which may simulate various natural or artificial stones. The colorants are typically mixed with the waste glass particles after grinding the waste glass into waste glass particles. The quantity of the colorants are preferably from 0.01–10% of the total weight of the construction material. The quantity of colorant depends not only on the intensity of color desired but also upon the size of the glass granulate, slag granulate or sand particles used. The smaller the granulate/particle size used, the lower the quantity of colorant needed to produce a given intensity level of coloring. Typically, the colorants are the very fine powder with particle sizes in the range of about 1.0–5.0 μm.

Additionally, a bonding agent may be added in addition to or in lieu of one or more colorants. The bonding agent is added in a quantity from about 0–15% by weight of the construction material, particularly is about 5%. The addition of the bonding agent may be added to any one or more of the layers. The presence of the bonding agent within the construction material prevents bubbles of gas from forming in the construction material during thermal treatment and rising to the surface, thus helping prevent defects from appearing on the outer surface of the resulting construction material. In addition, bonding agents such as $Na_2SiO_3$ or $K_2SiO_3$ can also be used for coloring glass particles. Use of the bonding agent is particularly useful when the particle size of the granulate, preferably glass granulate, is greater than about 1 mm, thus making it almost impossible to obtain a homogeneous mixture from the larger-sized glass particles with the very small, finely milled colorants; however, one or more bonding agents may be used with any size granulate, including those of 1 mm or less in size. The bonding agent is added to the material for each layer before packing the material into the mold.

The final layer placed within the heat resistant mold is the outer layer. Different designs may be made within this outer layer. To produce different designs, glass granulate in various colors is utilized. The coloring of this granulate may be provided by several means known in the art. First, a fine powder of glass granulate is mixed with any appropriate pigment well known in the art, together with a bonding agent and solvent, such as water, and the materials mixed, homogenized and extruded. This material is then dried and ground into the appropriate sized colored granules. An additional method comprises mixing together glass granulate with any colorant known in the art and a bonding agent, without the use of a solvent, extrusion or drying. Finally, colored granulate may be produced by using a high temperature kiln, with only glass granulate and colorant without the use of solvents or bonding agents.

In the present invention the materials are packed into a heat-resistant mold. The heat-resistant mold is made in various shapes, including plate or cylinder shaped. The plate-shaped mold may have a flat, concave or convex surface. The heat-resistant mold is preferably made of ceramic or metallic material. The heat-resistant mold generally has the same or smaller coefficient of thermal expansivity than that of the material used to form the construction material. The inner surface of the mold may optionally to be covered with a fluid solution of kaolin or other similar materials. Materials such as kaolin will not sinter during the thermal treatment of the construction material and facilitates removal of the final construction material from the mold. Preferably, the materials are placed in the mold and then compacted. The device used to compact the materials may be flat or have a concave or convex surface to produce a construction material having a shaped surface.

The material is then given its initial heat treatment in a electric kiln or in a continuous heating kiln, using any kiln well known in the art. A method according to the present invention is described generally below.

As shown in FIG. 1, a layer 10 of a material is packed into a mold 12. Preferably, the mold 12 is coated with a fluid layer of kaolin 13 prior to the addition of the layer 10 to help allow for removal of the finished construction material from the mold 12. The layer 10 has a first surface 14 and a second surface 16. The mold 12 has an inner mold surface 18, a mold bottom 20, a mold top 22 and mold sides 24. The first surface 14 is in contact with the inner mold surface 18 of the mold 12. The layer 10 may be then optionally compacted and leveled.

Figure 2:
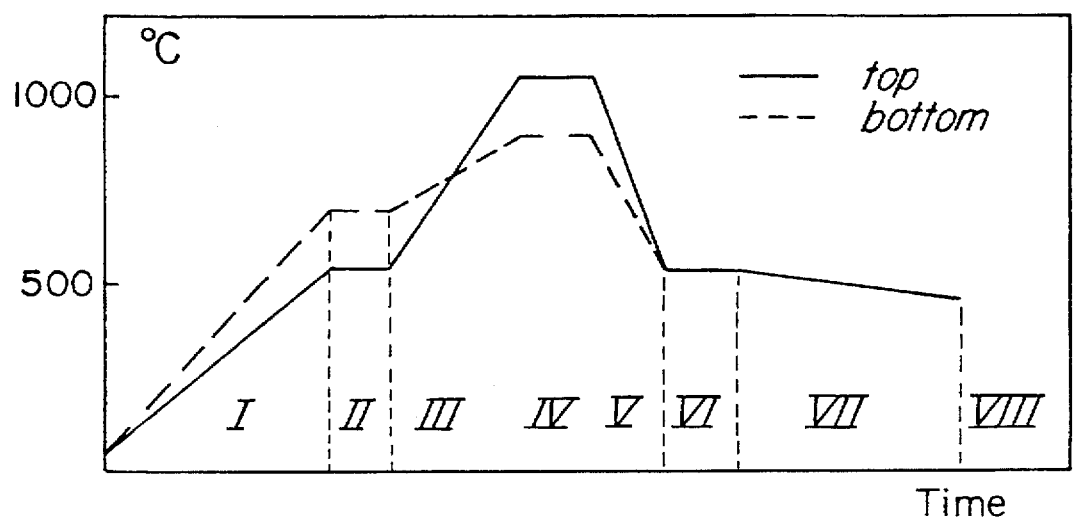
FIG. 2 is a graph of the temperature regimes of a first surface and second surface of the construction material shown in FIG. 1.

The layer 10 is then subjected to a first stage of heating, illustrated by Region I of FIG. 2. The layer 10 is then heated such that the first surface 14 reaches a first temperature which is no greater than the softening point, and the second surface 16 reaches a second temperature which is less than the first temperature, thus establishing a temperature gradient throughout the layer 10. Preferably, this temperature gradient should be no less than about 5 percent.

It has been surprisingly and unexpectedly discovered that this temperature gradient during the first stage of heating is very essential when the starting material used to produce the layer 10 is glass granulate containing paper and other impurities. It is necessary to have the temperature gradient between the first surface 14 and second surface 18 of the layer to prevent blemishes from appearing on the second surface 18 of the finished construction material. It is important to heat the mold 12 during the first heating stage from the mold bottom 20 in order to achieve the necessary temperature gradient between the first surface 14 and the second surface 16. When the temperature reaches a point greater than 400° C., the contaminants in the material used, such as paper and other waste, will burn off, producing combustion gases. By establishing a temperature gradient, the bubbles of air between the particles, as well as the combustion gases, move from the first surface 14 and up through the layer 10 to the second surface 16 and out of the layer 10. When the temperature of the first surface 14 achieves the softening point of the glass granulate, approximately 720–730° C. for bottle and window glass, the softening of the materials used will begin from the material adjacent to the mold bottom 20, and the bubbles of air and gas will pull to the second surface 16 and leave through this surface. The temperature of the second surface 16 should preferably be at least 50° C. less than the temperature of the first surface 14 to prevent the second surface 16 from collecting pores or bubbles and preventing the gasses from exiting the layer 10. The first and second temperatures will be maintained for a period of time, as shown in Region II of FIG. 2. All bubbles of gas within the layer 10 will be eliminated during this stage of thermal treatment. This time period will depend on the thickness of layer 10 as well as the quantities of paper and waste in the materials used to produce the layer 10. For layers of approximately 15 mm, the time period of heating will be about 15–30 minutes. After this first heating stage, the temperature is raised and a second heating stage conducted.

The layer 10 is further heated to a temperature sufficient to sinter the layer 10. The temperature of the layer 10 is such that a temperature gradient is established throughout the layer 10 with the first surface 14 having a third temperature and the second surface 16 having a fourth temperature greater than a third temperature. This temperature gradient is shown as Region III of FIG. 2. This temperature gradient is reversed from the temperature gradient established earlier.

The third and fourth temperatures are maintained such that a temperature gradient is held between the first surface 14 and the second surface 16, as illustrated by Region IV of FIG. 2. The third temperature will preferably be about 50–200° C. than the softening point of the glass granulate used to make up the layer 10. The forth temperature will be about 200–400° C. greater than the softening point of the material used to make up the layer 10. The second surface 16 will reach a maximum temperature during this time. For regular glass containing waste impurities and colorants, this maximum temperature will preferably range from 950–1100° C. The heating during this second stage will preferably be directed to a greater extent towards the mold top 22 or mold sides 24 than the mold bottom 20. The time that the temperature is maintained at this stage will be dependent upon the thickness of the layer 10 but must be sufficient to sinter the layer 10 to form a construction material having the second surface 16 being substantially defect-free. In a preferred embodiment, a 15 mm layer will be used requiring the third and fourth temperatures will be held for about 5–15 minutes.

The layer 10 is then cooled to a fifth temperature, such that the temperature gradient within the layer 10 is eliminated, as shown by Region V of FIG. 2. The layer 10 is cooled to a temperature near, but not more than, the upper annealing point of the glass granulate used to produce the layer 10. This fifth temperature is then maintained for a period of time to reduce the temperature gradient as much as possible, and preferably to between 10–15° C. for a thickness layer of 15 mm, as shown by Region VI of FIG. 2.

The layer 10 is then further cooled. Preferably, this further cooling is done slowly, at a rate of 0.5–5.0° C./minute until a temperature about 10–20° C. below the lower annealing point for the glass granulate used to create the layer 10 is reached, as illustrated by Region VII of FIG. 2. The layer 10 is then cooled to ambient temperature, preferably at a speed of 10–50° C./minute, as shown by Region VIII of FIG. 2.

Figure 3:
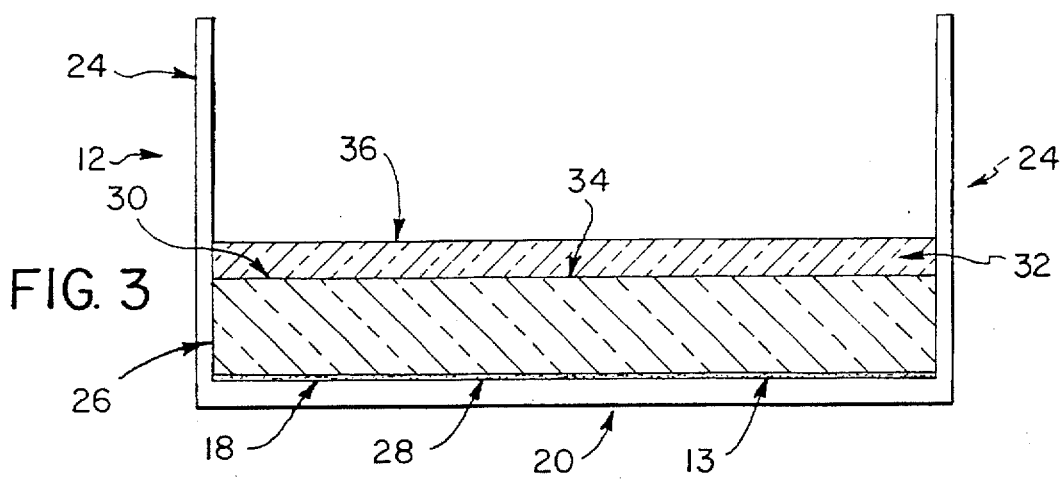
FIG. 3 is a cross section of a heat-resistant mold and a two layer construction material made in accordance with the present invention.

FIG. 3 illustrates a two layer construction material. As shown in FIG. 3, a two layered construction material is formed by placing a first layer 26 in the mold 12 having a first layer first surface 28 and a first layer second surface 30. The first layer first surface 28 is in contact with the inner mold surface 18 of the mold 12. Directly upon the first layer second surface 30 is disposed a second layer 32. Second layer 32 has a second layer first surface 34 and a second layer second surface 36. The second layer 32 is disposed on the first layer 26 such that the second layer first surface 34 is directly upon the first layer second surface 30. The first and second layers 26 and 32 are optionally level and/or compacted either singly or simultaneously. The first and second layers 26 and 32 are then thermally treated in the manner previously described, with the temperatures recited established on the first layer first surface 28 and second layer second surface 36 in lieu of the first surface 14 and second surface 16, respectively.

Figure 5:
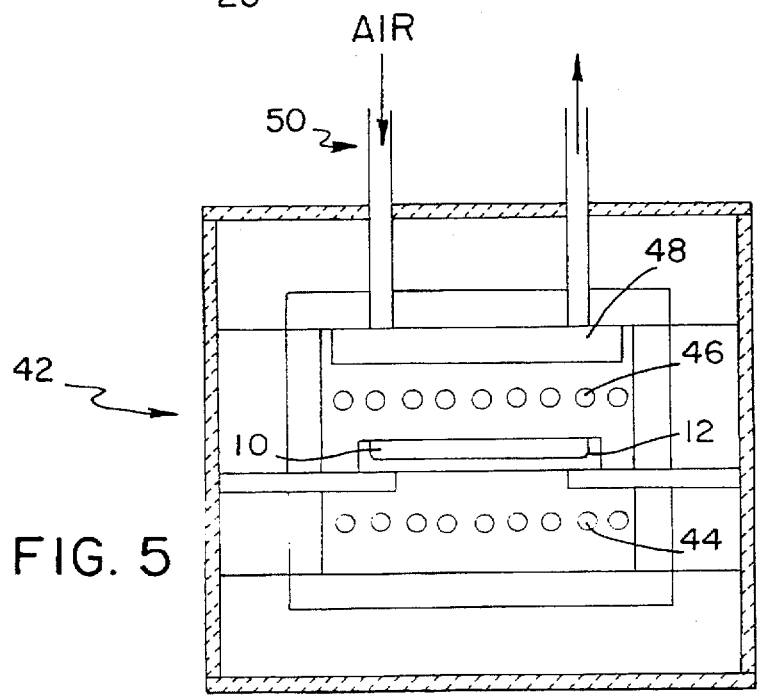
FIG. 5 is a cross section of an electric laboratory kiln used for producing a construction material according to the present invention.

If a three layer construction material is desired, an optional third layer 37 is added to the two layer design, as shown in FIG. 5. Generally, in the case of a three layer construction material, the first and third layers will together comprise about 10–30% of the total thickness of the layers. The third layer 37 will have a third layer first surface 38 and a third layer second surface 39. The third layer 37 is disposed directly upon the second layer 32 such that the third layer first surface 38 is directly upon the second layer second surface 36. The layers 26, 32 and 37 are optionally compacted and/or leveled either singly or simultaneously. The layers 26, 32 and 37 are then thermally treated in the manner previously described, with the temperatures established on the first layer first surface 28 and third layer second surface 39 in lieu of the first surface 14 and second surface 16, respectively.

If a multiple layer construction material, consisting of four or more layers is desired, each layer is placed in a heat resistant mold in the manner indicated for the two layered construction material, and the first surface of the initial layer and the second surface of the final layer used to calculate the temperatures during thermal treatment. As previously described, if distinct multiple key points, i.e., softening points, upper annealing points, and/or lower annealing points, exist for more than one layer in multiple layer construction materials, the lowest of each of the key points will preferably be utilized in the thermal process as the point at which the temperature is held during the process.

The invention is further described in the following non-limiting examples.

EXAMPLE 1

Method of Producing A Sink One Layer Construction Material

With reference to FIGS. 1 and 5, a fluid suspension of kaolin 13 was applied to the inside of the heat-resistant ceramic mold 12 as shown in FIG. 1. The layer 10 of material comprising about 18% sand by weight, about 80% glass granulate by weight, and about 2% colorant by weight was placed in the mold 12. The sand was silicate sand having particle size of less than 1 mm. The glass granulate was produced by grinding clear waste glass from which the paper contaminants had not been removed. The size of glass granulate and pieces of paper was less than 2 mm. The pigment (Special Inorganic Pigment BK 051-pink, Hydrometalurgicke Zavody Bruntal, Czech Republic) as a fine powder was mixed with glass granulate and then this mixture was mixed with the sand and placed into the mold 12 as the layer 10.

The layer 10 was leveled in the mold 12 without pressure. The mold 12 and the layer 10 were placed in an laboratory electric kiln 42, as illustrated in FIG. 5. The kiln 42 had bottom heating elements 44 and top heating elements 46. The bottom heating elements 44 and the top heat elements 46 were connected in two independent groups which were controlled independently. A heat exchanger 48 was present within the kiln 42 for cooling of the layer 10. The layer 10 was then subjected to the following heating regime.

For the initial heating regime, the bottom heating elements 44 heated the mold 12 with the layer 10 to bring the first surface 14 from room temperature to a temperature 700° C. over a 60 minute period. Initially, only the bottom heating elements 44 were used. Twenty minutes into the initial 60 minute heating regime, the top heating elements 46 were activated and used to heat the second surface 16 to a temperature of 550° C. over a 40 minute period. After reaching these temperatures, the bottom heating elements 44 were maintained at a temperature of 700° C. and the top heating elements 46 were maintained at the temperature 550° C. for 15 minutes.

The second heating regime was then begun. The top heating elements 46 were then used to heat the second surface 16 from 550° C. to 1030° C. over a 30 minute period. At the same time, the bottom heating elements 44 were used to heat first surface 14 from 700° C. to 850° C. These temperatures were maintained for 10 minutes. During this time, the layer 10 was sintered together to form a construction material.

The layer 10 was then rapidly cooled via cooling air 50 to reduce the temperature of the first surface 14 and the second surface 16 to 530° C. over a 20 minute period. This temperature was maintained for 15 minutes to eliminate the temperature gradient throughout the layer 10.

The layer 10 was then further cooled to 470° C. at a rate of 1.0° C./minute over a 60 minute period. This was followed by further cooling and annealing by lowering the temperature of the layer 10 to 40° C. over a 20 minute period.

The final construction material product had a thickness of 18 mm with a surface of light pink color. The construction material had a defect free second surface 16, which was removed from the mold 12 and trimmed.

EXAMPLE 2

Method of Producing a Black One Layer Construction Material

The layer 10 of material was placed in the heat-resistant mold 12 in the manner described in Example 1. The layer 10 comprised about 95% waste glass granulate having a particle size of less than 2 mm together with a black colorant (Special Inorganic Pigment BK 301—black, Hydrometalurgicke zavody Bruntal, Czech Republic). The colorant was added as a fine powder in an amount of about 5% a by weight and mixed with the glass granulate prior to being placed in the mold 12. The layer 10 was then thermally treated in the manner described in Example 1, and a construction material having a final thickness of 18 mm was produced. The construction material had a smooth, defect-free second surface had a black color with blue shade.

EXAMPLE 3

Method of Producing a Multicolored Two Layer Construction Material

Figure 6:
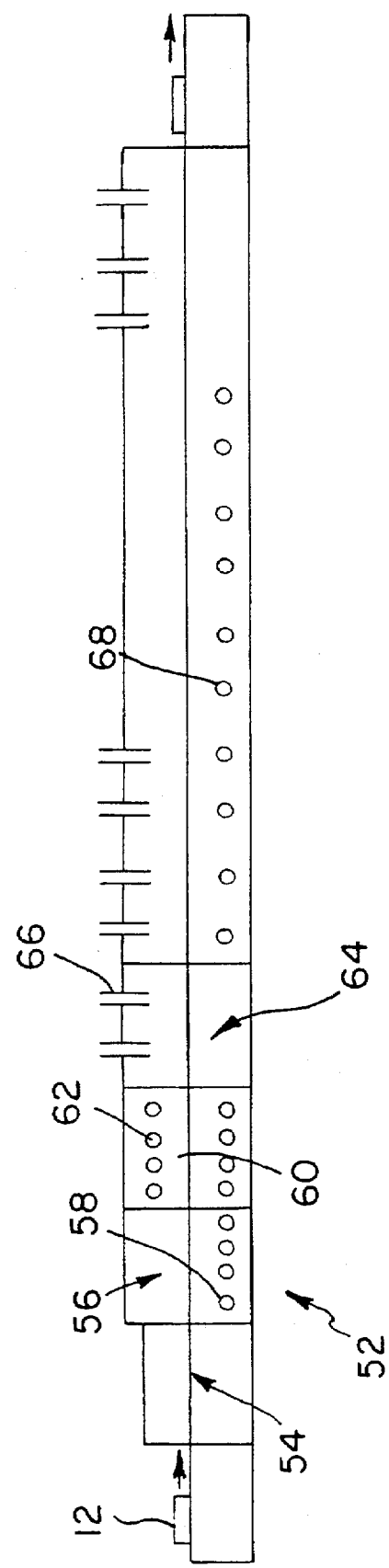
FIG. 6 is a schematic design of an automated gas roller kiln used for producing a construction material according to the present invention.

With reference to FIGS. 3 and 6, a fluid suspension of kaolin 13 was applied to the inside of the heat-resistant ceramic mold 12 as shown in FIG. 3. The first layer 26 of material comprising about 5% Kaolin powder by weight and about 95% glass granulate by weight, was placed in the mold 12. The glass granulate was produced by grinding colored waste glass from which the paper contaminants had not been removed. The size of glass granulate and pieces of paper was less than 2 mm. The thickness of the first layer 26 was 18 mm. The first layer 26 was leveled without compacting.

The second layer 32 of material comprising about 95.2% glass granulate (by weight) and 4.8% various colorants (by weight) was disposed on the first layer 26 in the manner previously described. The glass granulate was produced by grinding clear waste glass from which the paper contaminants had not been removed. The size of glass granulate with pieces of paper was less than 1 mm.

In order to obtain colored granules of different colors and different sizes, various colorants were added to individual portions of the glass granulate in various amounts. For obtaining white granules with size less than 2 mm, the glass granulate was mixed with 7% by weight of G Zircon (Cookson Mathey Corp., USA). To this mixture was added about 5% by weight (from total weight of glass powder and pigment) organic bonding agent, sodium carboxymethylcellulose, and mixed again and then about 25% by weight (from total weight of glass powder and pigment) water and mixed until homogeneous mixture was obtained. Then this material was extruded, dried and ground to produce white glass granules with a size of less than 2 mm. The same method was used for obtaining the next colored granules. The difference was only in the type of pigment and its amount. The amount of organic bonding agent and water was the same. Pale Blue granules with size from 1 to 2 mm were obtained by adding 1.2% by weight Special Inorganic Pigment BK 200 ("Hydrometalurgicke zavody Bruntal", Czech Republic); the granules size was from 1 to 2 mm. Dark Blue glass granules were obtained by adding of 1.5% by weight the same pigment BK 200; the granules size was from 2 to 4 mm. Black granules were obtained by adding of 2% by weight Ceramic Pigment F-3794 (Ferro Corporation, Italy); the granules size was from 1 to 4 mm.

The individual portions of colored granules were mixed in various amounts as follows: White—60% by weight, Pale Blue—16%, Dark Blue—22% and Black—2% and arranged in a design which mimicked the appearance of natural blue granite to form the second layer 32, which was then leveled without compacting. The second layer 32 had a thickness of 5 mm.

The mold 12, first layer 26 and second layer 32 were placed in a gas roller kiln 52, as illustrated in FIG. 6. The mold 12 and layers 26 and 32 were moved by rollers through the gas roller kiln 52 through different temperature zones established therein. The mold 12 and layers 26 and 32 initially moved into a first zone 56 of the gas roller kiln 52. The first zone 56 contained bottom burners 58. The bottom burners 58 heated the mold 12 and the layers 26 and 32 to establish a temperature gradient throughout the layers 26 and 32 to bring the first layer first surface 28 from room temperature to a temperature 700° C. and the second layer second surface to a temperature of 550° C. over a 30 minute period, and the temperatures maintained for 15 minutes.

The mold 12 and layers 26 and 32 were then moved via the rollers 54 to the second zone 60. The second zone contains both bottom burners 58 and top burners 62. The layers 26 and 32 were heated to reverse the temperature gradient throughout the layers 26 and 32 to bring the first layer first surface 28 to a temperature of 890° C. and the second layer second surface to a temperature of 1050° C. over a 20 minute period, and the temperatures maintained for 12 minutes. During this time, the layers 26 and 32 were sintered together to form a construction material.

The mold 12 and layers 26 and 32 were then moved via rollers 54 to a third zone 64 in the gas roller kiln 52 where the layers 26 and 32 were rapidly cooled via gas kiln fans 66 to reduce the temperature of the layer first surface first surface 28 and the second layer second surface 36 to 530° C. over a 18 minute period. This temperature was maintained for 15 minutes to eliminate the temperature gradient throughout the layers 26 and 32.

The mold 12 and the layers 26 and 32 were then moved via rollers 54 to a fourth zone 68 in the gas roller kiln 52, where the layers 26 and 32 were cooled via gas kiln fans 66 to reduce the temperature of the first layer first surface 28 and the second layer second surface 36 to 470° C. over a 40 minute period. This temperature was maintained for 5 minutes to finish annealing.

The mold 12 and the layers 26 and 32 were then moved via rollers 54 to a fifth zone 70 in the gas roller kiln 52 which contained only gas kiln fans 66 and no burners, where the layers 26 and 32 were cooled via gas kiln fans 66 to reduce the temperature of the layers 26 and 32 to ambient temperature over a 30 minute period. The final construction material product had a thickness of 15 mm and a defect-free second layer second surface 36. The construction material was removed from the mold 12 and trimmed. The glossiness of the second layer second surface 36 may be adjusted by altering the maximum temperature of the thermal treatment.

EXAMPLE 4

Method of Producing a Multicolored Three layer Construction material

Figure 4:
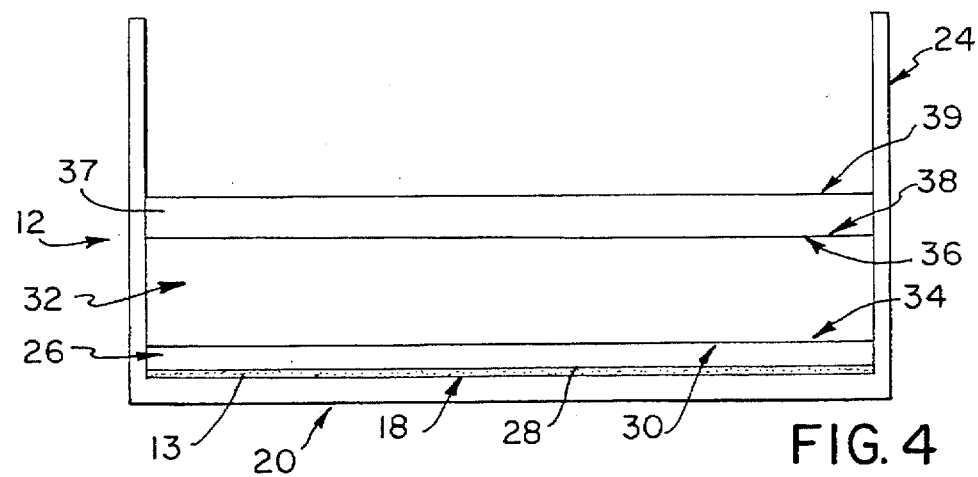
FIG. 4 is a cross section of a heat-resistant mold and a three layer construction material made in accordance with the present invention.

With reference to FIGS. 4 and 6, the first layer 26, the second layer 32 and the third layer 37 of material were placed in the heat-resistant mold 12 in the manner described in Example 1. The first layer 26 comprised about 40% slag granulate by weight, having a particle size between 2–3 mm, and about 60% sand by weight, the sand having a particle size between 1–2 mm. The thickness of the first layer was 4 mm. The second layer 32 comprised about 10% sand by weight, about 10% slag granulate by weight, and about 80% glass granulate by weight. The glass granulate was produced by grinding colored waste glass from which the paper contaminants had not been removed. The size of glass granulate and pieces of paper was less than 2.5 mm. The size of the slag granulate and sand was less than 1 mm. The thickness of the second layer 26 was 18 mm. The third layer 37 was disposed on the second layer 32 in the manner previously described. The third layer 37 comprised about 94% glass granulate by weight and 6% colorant by weight. The glass granulate was produced by grinding clear waste glass from which the paper contaminants had not been removed. Final size of the glass granulate containing paper waste was less than 1 mm.

In order to obtain colored granules of different colors and different sizes, various colorants were added to individual portions of the glass granulate in various amounts. The procedures of producing colored granules was as in Example 3, only instead of an organic bonding agent, an inorganic bonding agent, $Na_2SiO_3$, was used. White and black glass granules were created having the same color as those in Example 3 by using the amounts of pigments used in Example 3. The quantity of bonding agent was 5% by the weight of the glass granulate and pigment.

The individual portions of colored granules were mixed in various amounts as follows: White—85% by weight and Black—15% by weight, and arranged in a design which mimicked the appearance of natural granite to form the third layer 37, which was then leveled without compacting. The third layer 37 had a thickness of 5 mm.

The layers 26, 32 and 37 were then thermally treated in the manner described in Example 3, with the temperatures measured on the first layer first surface 28 and the third layer second surface 39 in lieu of the first layer first surface 28 and second layer second surface 36, respectively.

In heat treatment, the heating times were changed from room temperature to a temperature 700° C. over a 45 minute period, and the temperature maintained for 20 minutes due to the greater thickness of the materials over those in Example 3. Also heating to a maximum temperature 1050° C. was preformed over a 30 minute period, and the temperature maintained for 20 minutes. The cooling portion of the process was changed as follows: rapid cooling to 530° C. was over a 27 minute period and this temperature was maintained for 25 minutes. The cooling from 530° C. to 470° C. was over a 75 minute period.

A construction material having a final thickness of 27 mm was produced. The construction material had a smooth, defect-free third surface.

It is understood that the invention is not limited to the particular embodiments described herein as illustrative, but embraces all such modified forms thereof as come within the scope of the following claims.

What is claimed is:

1. A method of producing a construction material, comprising the steps of:
   (a) placing a layer in a mold, the layer having a first surface and a second surface, the layer comprising glass granulate;
   (b) heating the layer such that a temperature gradient is established throughout the layer, with the first surface having a first temperature no greater than the softening point, and the second surface having a second temperature less than the first temperature;
   (c) maintaining the first and second temperatures for a selected period of time;
   (d) heating the layer to a temperature sufficient to sinter the layer to produce a temperature gradient throughout the layer, with the first surface having a third temperature, and the second surface having a fourth temperature greater than the third temperature;
   (e) maintaining the third and fourth temperatures to sinter the layer into a construction material having a substantially defect-free second surface; and
   (f) cooling and annealing the construction material.

2. The method according to claim 1, wherein the layer comprises slag granulate, the layer being free of sand.

3. The method according to claim 1, wherein the layer is free of slag granulate and sand.

4. The method according to claim 1, wherein the layer additionally comprises a bonding agent.

5. The method according to claim 2, wherein the layer additionally comprises a bonding agent.

6. The method according to claim 3, wherein the layer additionally comprises a bonding agent.

7. The method according to claim 1, wherein the layer additionally comprises a colorant.

8. The method according to claim 2, wherein the layer additionally comprises a colorant.

9. The method according to claim 3, wherein the layer additionally comprises a colorant.

10. The method according to claim 3, wherein the glass granulate has a size in the range of 0.5–5 mm.

11. The method according to claim 1, wherein step (f) further comprises:
    (i) cooling the layer to a fifth temperature which is equal to or lower than the upper annealing point;
    (ii) maintaining the fifth temperature for a period sufficient to allow the first surface and second surface to reach about the same temperature and dissipate the temperature gradient throughout the layer;
    (iii) cooling the layer to a sixth temperature at a rate of about 0.5–5.0° C./min until a temperature about 10–20° C. below the lower annealing point is reached; and
    (iv) cooling the layer to ambient temperature at a rate of about 5–50° C./min.

12. The method according to claim 2, wherein step (f) further comprises:
    (i) cooling the layer to a fifth temperature which is equal to or lower than the upper annealing point;
    (ii) maintaining the fifth temperature for a period sufficient to allow the first surface and second surface to reach about the same temperature and dissipate the temperature gradient throughout the layer;
    (iii) cooling the layer to a sixth temperature at a rate of about 0.5–5.0° C./min until a temperature about 10–20° C. below the lower annealing point is reached; and
    (iv) cooling the layer to ambient temperature at a rate of about 5–50° C./min.

13. The method according to claim 3, wherein step (f) further comprises:
    (i) cooling the layer to a fifth temperature which is equal to or lower than the upper annealing point;
    (ii) maintaining the fifth temperature for a period sufficient to allow the first surface and second surface to reach about the same temperature and dissipate the temperature gradient throughout the layer;
    (iii) cooling the layer to a sixth temperature at a rate of about 0.5–5.0° C./min until a temperature about 10–20° C. below the lower annealing point is reached; and
    (iv) cooling the layer to ambient temperature at a rate of about 5–50° C./min.

14. A method of producing a construction material, comprising the steps of:
    (a) placing a first layer in a mold, the first layer having a first surface and a second surface, the first layer comprising glass granulate;
    (b) disposing a second layer on the first layer, the second layer having a first surface and a second surface, such that the first surface of the second layer is disposed directly upon the second surface of the first layer, the second layer comprising glass granulate;
    (c) heating the first and second layers such that a temperature gradient is established throughout the layers, with the first surface of the first layer having a first temperature no greater than the softening point, and the second surface of the second layer having a second temperature less than the first temperature of the first layer;
    (d) maintaining the first and second temperatures;
    (e) heating the first and second layers to a temperature sufficient to sinter the first and second layers to produce a temperature gradient throughout the first and second layers, with the first surface of the first layer having a third temperature, and the second surface of the second layer having a fourth temperature greater than the third temperature;

(f) maintaining the third and fourth temperatures to sinter the first and second layers into a construction material having a substantially defect-free second surface of the second layer; and (g) cooling and annealing the construction material.

15. The method according to claim 14, wherein at least one of the first and second layers comprise slag granulate, each layer being free of sand.

16. The method according to claim 14, wherein each of the first and second layers are free of slag granulate and sand.

17. The method according to claim 14, wherein at least one layer additionally comprises a bonding agent.

18. The method according to claim 15, wherein at least one layer additionally comprises a bonding agent.

19. The method according to claim 16, wherein at least one layer additionally comprises a bonding agent.

20. The method according to claim 16, wherein the first layer has a thickness of about 5–30 mm, and the second layer has thickness of about 1–6 mm.

21. The method according to claim 14, wherein step (g) further comprises:

(i) cooling the first and second layers to a fifth temperature which is equal to or lower than the upper annealing point;

(ii) maintaining the fifth temperature for a period sufficient to allow the first surface of the first layer and second surface of the second layer to reach about the same temperature and dissipate the temperature gradient throughout the layers;

(iii) cooling the first and second layers to a sixth temperature at a rate of about 0.5–5.0° C./min until a temperature about 10–20° C. below the lower annealing point is reached for both first and second layers; and (iv) cooling the first and second layers to ambient temperature at a rate of about 5–50° C./min.

22. The method according to claim 15, wherein step (g) further comprises:

(i) cooling the first and second layers to a fifth temperature which is equal to or lower than the upper annealing point;

(ii) maintaining the fifth temperature for a period sufficient to allow the first surface of the first layer and second surface of the second layer to reach about the same temperature and dissipate the temperature gradient throughout the layers;

(iii) cooling the first and second layers to a sixth temperature at a rate of about 0.5–5.0° C./min until a temperature about 10–20° C. below the lower annealing point is reached for both first and second layers; and (iv) cooling the first and second layers to ambient temperature at a rate of about 5–50° C./min.

23. The method according to claim 16, wherein step (g) further comprises:

(i) cooling the first and second layers to a fifth temperature which is equal to or lower than the upper annealing point;

(ii) maintaining the fifth temperature for a period sufficient to allow the first surface of the first layer and second surface of the second layer to reach about the same temperature and dissipate the temperature gradient throughout the layers;

(iii) cooling the first and second layers to a sixth temperature at a rate of about 0.5–5.0° C./min until a temperature about 10–20° C. below the lower annealing point is reached for both first and second layers; and (iv) cooling the first and second layers to ambient temperature at a rate of about 5–50° C./min.

24. The method according to claim 14, wherein the temperature gradient between the first and second layers in step (c) is about five percent or greater.

25. The method according to claim 15, wherein the temperature gradient between the first and second layers in step (c) is about five percent or greater.

26. The method according to claim 16, wherein the temperature gradient between the first and second layers in step (c) is about five percent or greater.

27. A method of producing a construction material, comprising the steps of:

(a) placing a first layer in a mold, the first layer having a first surface and a second surface, the first layer comprising glass granulate;

(b) disposing a second layer on the first layer, the second layer having a first surface and a second surface, such that the first surface of the second layer is disposed directly upon the second surface of the first layer, the second layer comprising glass granulate;

(c) disposing a third layer on the second layer, the third layer having a first surface and a second surface, such that the first surface of the third layer is disposed directly upon the second surface of the second layer, the third layer comprising glass granulate;

(d) heating the layers such that a temperature gradient is established throughout the layers, with the first surface of the first layer having a first temperature no greater than the softening point, and the second surface of the third layer having a second temperature less than the first temperature;

(e) maintaining the first and second temperatures;

(f) heating the layers to a temperature sufficient to sinter the layers to produce a temperature gradient throughout the layers, with the first surface of the first layer having a third temperature, and the second surface of the third layer having a fourth temperature greater than the third temperature;

(g) maintaining the third and fourth temperatures to sinter the layers into a construction material having a substantially defect-free second surface of the third layer; and (h) cooling and annealing the construction material.

28. The method according to claim 27, wherein at least one layer comprises slag granulate, each layer being free of sand.

29. The method according to claim 27, wherein each layer is free of slag granulate and sand.

30. The method according to claim 27, wherein at least one layer additionally comprises a bonding agent.

31. The method according to claim 28, wherein at least one layer additionally comprises a bonding agent.

32. The method according to claim 29, wherein at least one layer additionally comprises a bonding agent.

33. The method according to claim 29, wherein the first layer has a thickness of about 5–30 mm, and the second layer has thickness of about 1–6 mm.

34. The method according to claim 27, wherein step (h) further comprises:

(i) cooling all the layers to a fifth temperature which is equal to or lower than the upper annealing point;

(ii) maintaining the fifth temperature for a period sufficient to allow the first surface of the first layer and second surface of the third layer to reach about the same temperature and dissipate the temperature gradient throughout all the layers;

(iii) cooling all the layers to a sixth temperature at a rate of about 0.5–5.0° C./min until a temperature about 10–20° C. below the lower annealing point is reached for all the layers; and (iv) cooling all the layers to ambient temperature at a rate of about 5–50° C./min.

35. The method according to claim 28 wherein step (h) further comprises:

(i) cooling all the layers to a fifth temperature which is equal to or lower than the upper annealing point;

(ii) maintaining the fifth temperature for a period sufficient to allow the first surface of the first layer and second surface of the third layer to reach about the same temperature and dissipate the temperature gradient throughout all the layers;

(iii) cooling all the layers to a sixth temperature at a rate of about 0.5–5.0° C./min until a temperature about 10–20° C. below the lower annealing point is reached for all the layers; and (iv) cooling all the layers to ambient temperature at a rate of about 5–50° C./min.

36. The method according to claim 29, wherein step (h) further comprises:

(i) cooling all the layers to a fifth temperature which is equal to or lower than the upper annealing point;

(ii) maintaining the fifth temperature for a period sufficient to allow the first surface of the first layer and second surface of the third layer to reach about the same temperature and dissipate the temperature gradient throughout all the layers;

(iii) cooling all the layers to a sixth temperature at a rate of about 0.5–5.0° C./min until a temperature about 10–20° C. below the lower annealing point is reached for all the layers; and (iv) cooling all the layers to ambient temperature at a rate of about 5–50° C./min.

37. The method according to claim 27, wherein the temperature gradient between the first and third layers in step (d) is about five percent or greater.

38. The method according to claim 28, wherein the temperature gradient between the first and third layers in step (d) is about five percent or greater.

39. The method according to claim 29, wherein the temperature gradient between the first and third layers in step (d) is about five percent or greater.

* * * * *